(12) United States Patent
Kim

(10) Patent No.: US 8,708,395 B1
(45) Date of Patent: Apr. 29, 2014

(54) ATTACHMENT FLAP FOR VEHICLE SUN VISORS

(71) Applicant: Sun Y. Kim, Hayward, CA (US)

(72) Inventor: Sun Y. Kim, Hayward, CA (US)

(*) Notice: Subject to any disclaimer, the term of this patent is extended or adjusted under 35 U.S.C. 154(b) by 0 days.

(21) Appl. No.: 13/798,114

(22) Filed: Mar. 13, 2013

(51) Int. Cl.
B60J 3/00 (2006.01)

(52) U.S. Cl.
USPC .................. 296/97.5; 296/97.1; 296/97.2

(58) Field of Classification Search
USPC .............. 296/97.1, 97.2, 97.5, 97.7
See application file for complete search history.

(56) References Cited

U.S. PATENT DOCUMENTS

| | | | | |
|---|---|---|---|---|
| 4,978,160 A * | 12/1990 | Welschoff | .................. | 296/97.8 |
| 5,044,685 A * | 9/1991 | Yang | .................. | 296/97.6 |
| 5,080,420 A * | 1/1992 | Hemmeke et al. | .................. | 296/97.1 |
| 5,402,924 A * | 4/1995 | Gilson | .................. | 224/312 |
| 5,730,484 A * | 3/1998 | Robinson | .................. | 296/97.6 |
| 5,873,620 A * | 2/1999 | Lu | .................. | 296/97.5 |
| 6,059,347 A * | 5/2000 | Davalos | .................. | 296/97.6 |
| 6,176,539 B1 * | 1/2001 | Westerman | .................. | 296/97.6 |
| 6,705,661 B2 * | 3/2004 | Amirmoini | .................. | 296/97.6 |
| 2011/0109117 A1 * | 5/2011 | Marcus et al. | .................. | 296/97.5 |
| 2011/0260491 A1 * | 10/2011 | Ebisuoka | .................. | 296/97.5 |

FOREIGN PATENT DOCUMENTS

| | | | | |
|---|---|---|---|---|
| EP | 285589 A2 * | 10/1988 | .................. | B60J 3/02 |
| EP | 291435 A1 * | 11/1988 | .................. | B60J 3/02 |
| JP | 06048174 A * | 2/1994 | .................. | B60J 3/02 |

* cited by examiner

*Primary Examiner* — Lori Lyjak
(74) *Attorney, Agent, or Firm* — Richard Esty Peterson

(57) ABSTRACT

An auxiliary sun flap for a conventional vehicle sun visor that has a shade panel configured to fold within the perimeter of a conventional vehicle sun visor where the visor has an edge and the shade panel is connected to the edge of the visor and the shad panel has a hinge connected to one end of the shade panel and a connector that connects to the sun visor edge such that the shade panel folds against the conventional vehicle sun visor during periods of non-use and folds outward to extend the effective shade area of the vehicle sun visor.

11 Claims, 2 Drawing Sheets

ATTACHMENT FLAP FOR VEHICLE SUN VISORS

RELATED APPLICATIONS

This application relies on the priority date of U.S. Provisional Patent Application Ser. No. 61/755,447, filed Jan. 22, 2013, entitled, "Attachment Flap for Vehicle Sun Visors.

FIELD OF INVENTION

This invention relates to the field of accessory devices added to the conventional sun visor of a vehicle, particularly an automobile. In particular, the invention relates to an accessory attachment to a traditional sun visor to extend the shading protection to the side window of the vehicle concurrently with the vehicle visor providing shading protection to the front windshield of the vehicle.

BACKGROUND OF THE INVENTION

The sun visor attachment of this invention is designed to shade the side window at the same time the sun visor is shading the front window. A typical problem encountered in road travel is the awkward location of the rising or setting sun at the junction of the front windshield and the side window. Minor variations in direction ordinarily require flipping the vehicle equipped sun visor from front to side repeatedly. The sun visor attachment of this invention is designed to solve this problem by providing an auxiliary sun flap that is attached to the factory equipped sun visors for typical vehicles. It is contemplated that after driver acceptance, the auxiliary sun flap will become a permanent addition to the traditional vehicle sun visor.

SUMMARY OF THE INVENTION

The auxiliary sun flap for a conventional vehicle sun visor is designed to attach to the edge of the vehicle sun visor with a pivotal connection and be capable of extending the shade of a sun visor to the side window when needed. In a preferred embodiment the auxiliary sun flap has a clip and hinge assembly that releasably attaches to the side edge of the vehicle sun visor and allows a shading sun flap to fold in against the top of the sun visor when not in use and fold out against the side window when the vehicle sun visor is in use to shade the front windshield.

It is to be understood that the sun flap can be secured permanently to the sun visor and include a ball hinge for bi-directional rotation to better conform to the drivers desired positioning of the main sun visor and the auxiliary sun flap. These and other features are described in greater detail in the Detailed Description of the Preferred Embodiments.

DETAILED DESCRIPTION OF THE PREFERRED EMBODIMENTS

Figure 1:
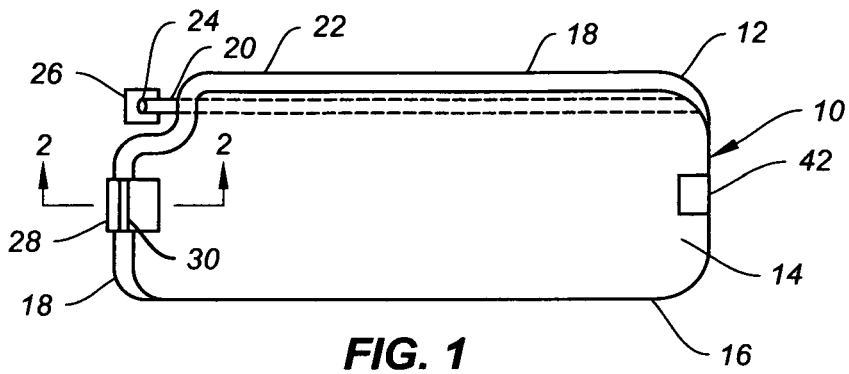
FIG. 1 is a side elevational view of the auxiliary sun flap coupled to a conventional vehicle sun visor.
Figure 2:
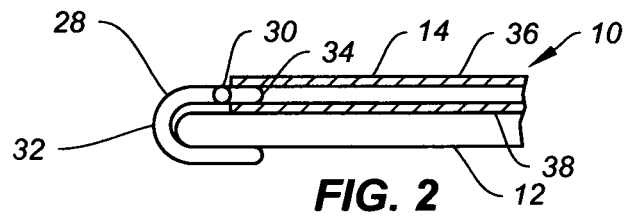
FIG. 2 is an enlarged partial cross section of the sun flap of FIG. 1 as coupled to the sun visor shown in part in an edge view.
Figure 3:
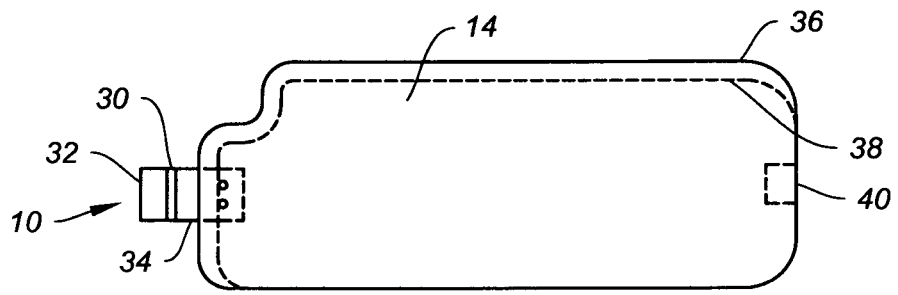
FIG. 3 is a side elevational view of the auxiliary sun flap with a hinge for permanent attachment.

A preferred embodiment is of the auxiliary sun flap, designated generally by the reference numeral 10, is shown in FIGS. 1-3. The sun flap 10 in FIG. 1 is shown releasably attached to the top side of a conventional vehicle sun visor 12. The sun flap 10 has a shade panel 14 having a perimeter 16 that substantially conforms to the perimeter 18 of the vehicle sun visor 12 when the sun flap 10 is located on top of the sun visor 12 in the folded storage position.

The vehicle sun visor 12 typically has a support rod 20 embedded in the shade flap 22 of the vehicle sun visor 12 allowing the vehicle shade flap 22 to pivot about the support rod 20. Additionally, the support rod 20 has a bent end 24 that anchors into a pivot bracket 26 mounted to the vehicle interior near a side window (not shown). This arrangement allows the vehicle sun visor 12 to swing to a position against the side window to block the sun.

The auxiliary sun flap 10 has a hinged clip 28 mounted at the edge of the contoured shade panel 14. The hinged clip 28 engages the side edge of the vehicle visor 12 that is adjacent the exposed support rod 20 and pivot bracket 26 as shown in FIG. 1. The arrangement is naturally reversed for the sun visor of the vehicle windshield at the passenger side. The hinged clip 28 is preferably fabricated of a plastic with an integral hinge 30 as shown in FIG. 2.

Referring to FIG. 2, the hinged clip 28 has U-shaped clamp portion 32 on one side of the hinge 30 that wraps around the edge of the vehicle visor 12, and a tongue portion 34 that is embedded in the shade panel 14. The shade panel 14 is fabricated from two layers 36 and 38 of light blocking plastic sheet material that are laminated together to sandwich the tongue portion 34 of the hinged clip 28 there between. In FIG. 3, the layers are shown before the hinged clip 28 in installed and the layers closed, at least around the edges. The shade panel 14 may also be fabricated from a single thickness of sun blocking material and may comprise a tinted plastic that allows some visual transparency in the manner of sun glass lenses. The material is preferably UV blocking, particularly if fabricated from a translucent or semi-transparent and tinted plastic.

To retain the shade panel 14 of the auxiliary sun flap 10 against the sun visor 14 during periods of non-use, the underside edge opposite the hinged edge is equipped with one element 40 of a hook and pile fastener. A complimentary element 42 of the hook and pile fastener is adhered to the top side of the vehicle sun visor 14 opposite the shade panel element 40. This fastener means secures the auxiliary sun flap 10 to the vehicle visor 14 and allows quick release for use.

In use the vehicle visor 14 is pivoted downward toward the windshield and the auxiliary sun flap 10 is pivoted toward the vehicle side window.

Figure 4:
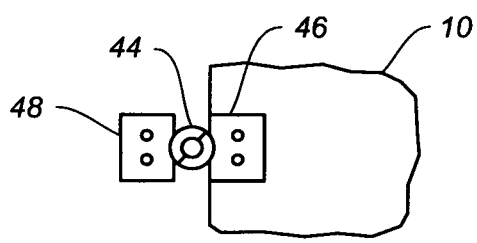
FIG. 4 is a side view of an alternate ball hinge for bi-directional articulation of the sun flap shown in part.

To extend the articulation of the auxiliary sun flap 10, an alternate type of hinge can be utilized that allows bi-directional pivot. As shown in FIG. 4, the sun flap 10 has a ball or swivel hinge 44 with a hinge leaf 46 embedded in the shade panel 14 and a hinge leaf 48 that is attachable to the vehicle visor by screws or adhesive (not shown).

Figure 5:
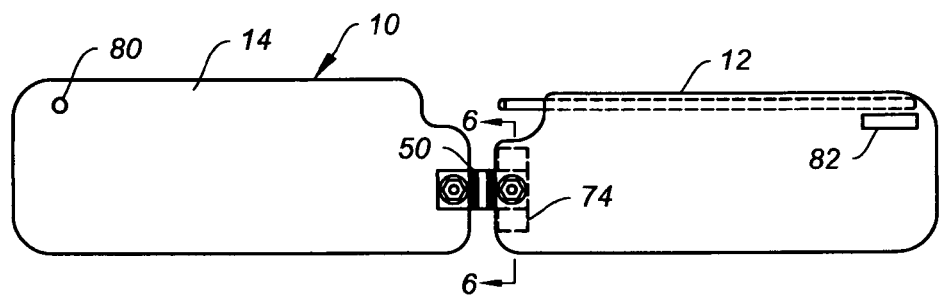
FIG. 5 is a side elevational view of the auxiliary sun flap with an alternate double hinge for articulation of the sun flap on a typical sun visor.
Figure 6:
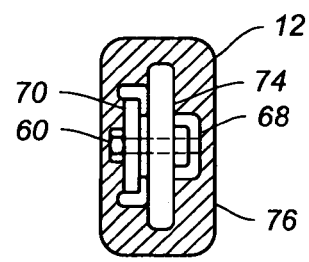
FIG. 6 is a cross sectional view taken on the lines 6-6 of the embedded portion of the double hinge of FIG. 5.
Figure 7:
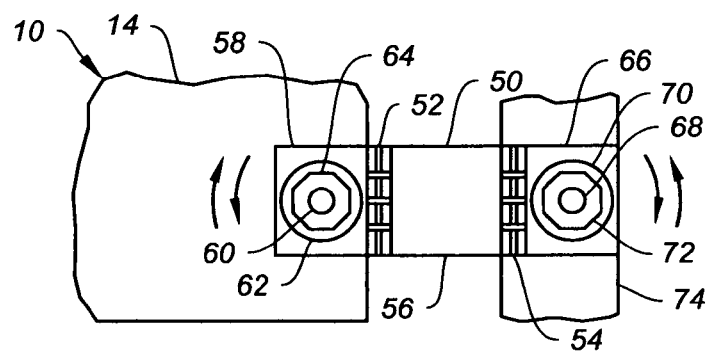
FIG. 7 is an enlarged partial view of the double hinge in the flap of FIG. 5.

Referring now to FIGS. 5-7, an alternate hinge connection is shown for connecting the auxiliary sun flap 10 to a conventional vehicle sun visor 12. The alternate hinge connection utilizes a double hinge 50 having two hinge axes 52 and 54 with a center plate 56 that allows the hinge to accommodate a thick sun visor 12. The double hinge has a first end plate 58 that connects to the shade panel 14 with a plastic or stainless steel bolt 60 having friction washers 62 and an aircraft nut 64 that once tightened, will not loosen on articulation of the sun flap 10. The second end plate 66 of the double hinge 50 is attached in a similar manner with a bolt 68, friction washers 70 and an aircraft nut 72 that attach the end plate 66 to an anchor pad 74.

The anchor pad 74 and attachment assembly is inserted into a slit in the edge of the vehicle sun visor 12 and glued to the inside of the visor shell 76 as shown in FIG. 6. In this manner the shade panel 14 is able to pivot on the axis of the bolt 60 on the first end plate 58 as well as pivot on the axis of the bolt 68 on the second end plate 66 concurrently with pivoting on the first hinge axis 52 and the second hinge axis 54. The multiple axis pivot of the alternate hinge system improves the degree of articulation and allows attachment of the sun flap 10 to the thickest of vehicle sun visors with the shade panel 14 folding to either the front or back of the vehicle visor 12.

In addition, the far end of the shade panel 14 includes a powerful button magnet 80 that couples to a steel strip 82 on each side of the vehicle sun visor 12. A similar steel strip can be attached above the vehicle windows to retain the sun flap 10 in its extended position.

These and other similar alterations can be made without departing from the scope of this invention.

The invention claimed is:

1. An auxiliary sun flap for a conventional vehicle sun visor comprising:
   a shade panel configured to fold within the perimeter of a conventional vehicle sun visor the visor having an edge and the shade panel connectable to the edge of the visor;
   a hinge connected to one end of the shade panel and having a coupler that couples to the sun visor edge, wherein the shade panel folds against the conventional vehicle sun visor during periods of non-use and folds outward to extend the effective shade area of the vehicle sun visor.

2. The auxiliary sun flap of claim 1 wherein the hinge is a multidirectional hinge for maximizing the articulation of the sun flap.

3. The auxiliary sun flap of claim 1 wherein the shade panel is connected to the edge of the visor with a releaseable clamp.

4. The auxiliary sun flap of claim 1 wherein the shade panel has and edge with the hinge having first hinge plate connected to the edge of the shade panel and a second hinge plate connected to the edge of the vehicle sun visor.

5. The auxiliary sun flap of claim 4 wherein the hinge is a double hinge with a center plate hingedly connected to the first hinge plate and hingedly connected to the second hinge plate.

6. The auxiliary sun flap of claim 5 wherein the connection of the edge of the shade panel to the first hinge plate is with a pivotal connector, wherein the shade panel pivots relative to the first hinge plate.

7. The auxiliary sun flap of claim 6 wherein the connection of the edge of the vehicle sun visor to the second hinge plate is with a pivotal connector, wherein the vehicle sun visor pivots relative to the second hinge plate.

8. The auxiliary sun flap of claim 4 wherein the hinge has a bi-directional articulation.

9. The auxiliary sun flap of claim 1 wherein the shade panel has attachment means for releasably attaching the shade panel to the vehicle sun visor.

10. The auxiliary sun flap of claim 9 wherein the attachment means is a hook and loop assembly.

11. The auxiliary sun flap of claim 10 wherein the attachment means is a magnet and steel attachment assembly.

\* \* \* \* \*